United States Patent
Francis et al.

(10) Patent No.: US 9,423,017 B1
(45) Date of Patent: Aug. 23, 2016

(54) TRANSFER CASE AND HYDRAULIC CLUTCH FOR DRIVELINE WITH ACTIVE HYDRAULIC FLUID RESERVOIR REFILL

(71) Applicant: BORGWARNER INC., Auburn Hills, MI (US)

(72) Inventors: Philip John Francis, Lapeer, MI (US); Thomas Patrick Knox, Waterford, MI (US); Hans Jacobsson, Gantofta (SE); Michael Palazzolo, Madison Heights, MI (US); Stephanie Paul, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/696,647

(22) Filed: Apr. 27, 2015

(51) Int. Cl.
| F16H 57/05 | (2006.01) |
| F16D 25/12 | (2006.01) |
| F16H 57/04 | (2010.01) |
| F16D 13/74 | (2006.01) |

(52) U.S. Cl.
CPC ............ *F16H 57/0446* (2013.01); *F16D 13/74* (2013.01); *F16D 25/123* (2013.01); *F16H 57/0404* (2013.01); *F16H 57/05* (2013.01)

(58) Field of Classification Search
None
See application file for complete search history.

(56) References Cited

U.S. PATENT DOCUMENTS

| 4,367,661 | A | * | 1/1983 | Moroto | .................. | B60K 17/35 74/606 R |
| 4,922,765 | A | * | 5/1990 | Hayakawa | ........... | B60K 17/344 184/6.12 |
| 8,235,198 | B2 | | 8/2012 | Pritchard et al. | | |
| 2007/0137966 | A1 | | 6/2007 | Francis et al. | | |
| 2008/0308354 | A1 | * | 12/2008 | Gratzer | ................ | B60K 17/344 184/6.12 |
| 2010/0101351 | A1 | * | 4/2010 | Lafer | .................... | B60K 17/344 74/467 |
| 2014/0094333 | A1 | * | 4/2014 | Ebner | ..................... | F16H 57/05 474/91 |

* cited by examiner

*Primary Examiner* — Richard Lorence
(74) *Attorney, Agent, or Firm* — Miller, Matthias & Hull LLP

(57) ABSTRACT

A transfer case and hydraulic clutch assembly for a motor vehicle driveline include a hydraulic fluid circuit in communication with a cavity disposed opposite a piston from a clutch pack for delivering pressurized fluid to the cavity for biasing the piston towards the clutch pack thereby activating the clutch. The transfer case and hydraulic clutch assembly also include a lubricant fluid circuit that is in communication with the chain that links the input sprocket to the output sprocket during use, as the chain rotates around the input sprocket and output sprocket, the lubricant fluid drips from or is sprayed from the chain. At least part of this released fluid is captured by a screen disposed above the hydraulic fluid reservoir. The screen removes any metal particles or debris and then passes the screen fluid into the hydraulic fluid reservoir thereby replenishing the hydraulic fluid reservoir without resorting to a time consuming and costly maintenance procedure.

12 Claims, 5 Drawing Sheets

TRANSFER CASE AND HYDRAULIC CLUTCH FOR DRIVELINE WITH ACTIVE HYDRAULIC FLUID RESERVOIR REFILL

BACKGROUND

1. Technical Field

This document discloses a hydraulic fluid circuit for actuating a clutch pack of a hydraulic clutch assembly for use in a motor vehicle driveline.

2. Description of the Related Art

Rotary powered transmission systems, such as transfer cases, rear differentials and front differentials may employ hydraulically actuated clutches. These clutches are controlled with a hydraulic fluid circuit. Conventional hydraulic fluid circuits for clutch actuation are typically closed systems, and include a reservoir within the driveline assembly to accommodate any loss of fluid due to leakage or changes in the system due to thermal effects. Because some of the hydraulic fluid from the hydraulic fluid circuit is typically lost over time, the reservoir may need to be accessed externally for replenishing the circuit with hydraulic fluid. However, for many vehicles, access to the reservoir is difficult because of the tight packaging of driveline components surrounding the reservoir and the corresponding tortuous pathway to the reservoir. Therefore, replenishing the reservoir as a part of regular maintenance procedures is time consuming and costly.

Thus, there is a need for a hydraulic clutch assembly that can automatically or actively refill or replenish its hydraulic fluid circuit without resorting to a costly maintenance procedure.

SUMMARY OF THE DISCLOSURE

In one aspect, this document discloses a hydraulic clutch assembly for a motor vehicle driveline. The disclosed clutch assembly may include a primary output shaft selectively coupled to an input sprocket by a clutch pack. The assembly may further include a secondary output shaft coupled to an output sprocket. The input sprocket may be coupled to the output sprocket by a chain. The clutch pack may include a first plurality of disks and a second plurality of disks interleaved with the first plurality of disks. The first plurality of disks may be coupled to the primary output shaft and the second plurality of disks may be coupled to the input sprocket. The clutch may further include a piston disposed between a cavity and the clutch pack. The disclosed assembly may further include a hydraulic fluid circuit in fluid communication with the cavity for delivering pressurized fluid to the cavity for biasing the piston towards the clutch pack to compress the clutch pack. The disclosed clutch assembly may further include a lubricant fluid circuit in fluid communication with the chain and the clutch pack. Finally, the disclosed assembly may include a screen in fluid communication with the hydraulic fluid circuit. The screen may be positioned to capture lubricant fluid that drips from or that is sprayed from the chain and/or the clutch pack. The lubricant fluid captured on the screen then passes through the screen to replenish the hydraulic fluid circuit with lubricant fluid released from the chain and/or clutch pack after said lubricant fluid passes through the screen.

In another aspect, this document discloses a transfer case for a motor vehicle driveline. The transfer case may include a housing that rotatably supports a primary output shaft and a secondary output shaft. The primary output shaft may be selectively coupled to an input sprocket by a clutch. The secondary output shaft may be coupled to an output sprocket. The input and output sprockets may be linked by a chain. The clutch may include a clutch pack including a first plurality of disks and a second plurality of disks interleaved with the first plurality of disks. The first plurality of disks may be coupled to the primary output shaft and the second plurality of disks may be coupled to the input sprocket. The clutch may further include a piston disposed between a cavity and the clutch pack. A transfer case may further include a hydraulic fluid circuit that may include a reservoir in fluid communication with a pump that is in fluid communication with the cavity for delivering pressurized fluid to the cavity thereby biasing the piston towards the clutch pack to compress the clutch pack. The transfer case may further include a lubricant fluid circuit including a sump in fluid communication with the chain and the clutch pack. The transfer case may further include a screen connected to the housing and disposed above and in fluid communication with the reservoir. The screen may be positioned to capture lubricant fluid that is released (i.e. by dripping or spraying or both) from the chain and/or the clutch pack. The captured lubricant fluid passes through the screen and replenishes the hydraulic fluid circuit with lubricant fluid that is released from the chain and/or clutch pack after said lubricant fluid passes through the screen.

In yet another aspect, this document discloses a method for replenishing a hydraulic fluid circuit of a transfer case with fluid from a lubricant circuit of the transfer case. The method may include providing a housing that rotatably supports a primary output shaft and a secondary output shaft. The method may further include coupling the primary output shaft to an input sprocket via a clutch pack and coupling the secondary output shaft to an output sprocket. The method may further include coupling the input sprocket to the output sprocket with a chain. The method may further include providing a hydraulic fluid circuit including a reservoir that may be in fluid communication with a pump that may be in fluid communication with a cavity that is in fluid communication with a piston. The method may further include providing a lubricant fluid circuit including a sump in fluid communication with the chain and the clutch pack. The method may further include delivering pressurized hydraulic fluid to the cavity thereby biasing the piston towards the clutch pack. The method may further include compressing the clutch pack to transfer torque from the primary output shaft to the input sprocket and from the input sprocket to the output sprocket through the chain. The method may further include providing a screen disposed below at least part of the chain and above the reservoir. The method may further include capturing at least some lubricant fluid released from the chain and/or clutch pack on the screen, filtering the captured lubricant fluid with the screen and passing the filtered lubricant fluid to the reservoir.

In any one or more of the embodiments described above, the hydraulic fluid circuit and the lubricant fluid circuit may each contain hydraulic based fluid.

In any one or more of the embodiments described above, the hydraulic fluid circuit may include a pump disposed upstream of the cavity.

In any one or more of the embodiments described above, the lubricant fluid that is released from the chain and/or clutch pack may drip onto the screen or be sprayed onto the screen, or a combination of the two.

In any one or more of the embodiments described above, the hydraulic fluid circuit may include a hydraulic fluid reservoir and the screen may be disposed above the hydraulic fluid reservoir and below at least part of the chain. In other embodiments, the screen may capture enough lubricant fluid to replenish the hydraulic fluid reservoir without being disposed below the chain.

In any one or more of the embodiments described above, the screen may be surrounded by a frame and the frame may be releasably connected above a hydraulic fluid reservoir.

Further, the frame may be releasably connected to the reservoir and/or the housing of the transfer case.

The features, functions, and advantages discussed above may be achieved independently in various embodiments or may be combined in yet other embodiments, further details of which can be seen with reference to the following description and drawings.

BRIEF DESCRIPTION OF THE DRAWINGS

For a more complete understanding of the disclosed methods and apparatuses, reference should be made to the embodiments illustrated in greater detail in the accompanying drawings, wherein.

The drawings are not necessarily to scale and illustrate the disclosed embodiments diagrammatically and in partial views. In certain instances, this disclosure may omit details which are not necessary for an understanding of the disclosed methods and apparatuses or which render other details difficult to perceive. Further, this disclosure is not limited to the particular embodiments illustrated herein.

DETAILED DESCRIPTION OF THE PRESENTLY PREFERRED EMBODIMENTS

Figure 1:
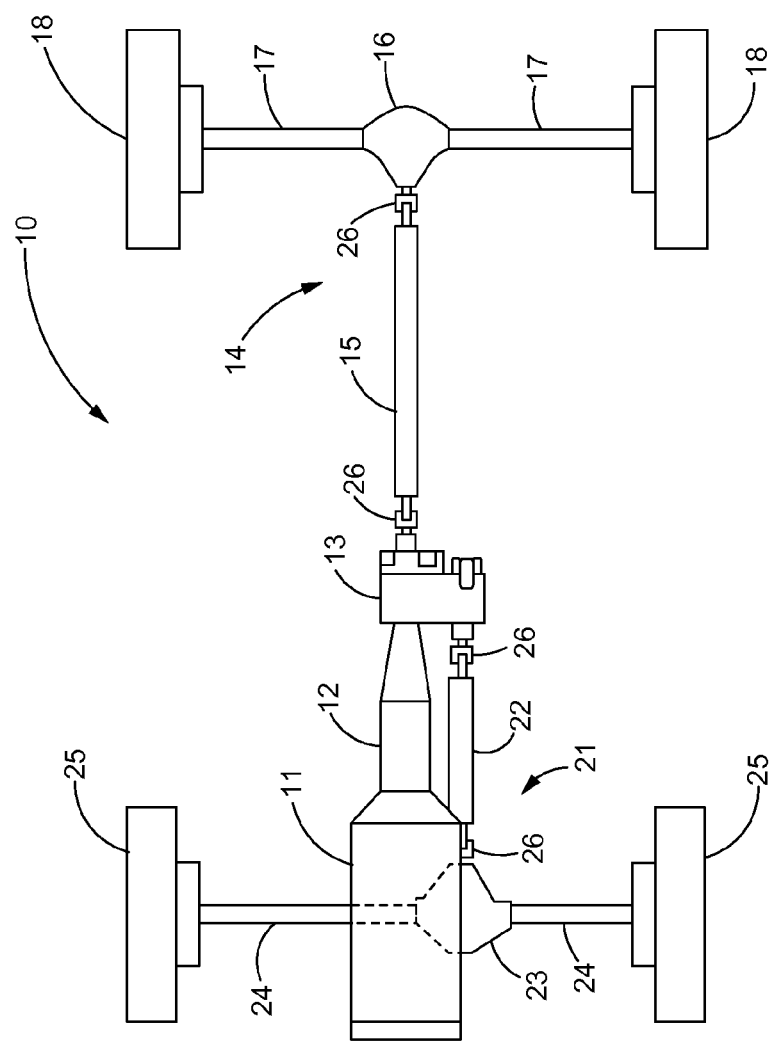
FIG. 1 is a plan view of a motor vehicle driveline including a transfer case made in accordance with this disclosure.

Referring to FIG. 1, a vehicle driveline system 10 includes an engine 11, which drives a transmission 12. The transmission 12 may be a manual transmission with a clutch or an automatic transmission. The output of the transmission 12 drives a transfer case 13. In turn, the transfer case 13 operably couples to and drives a primary (rear) driveline assembly 14. The primary driveline assembly 14 includes a primary (rear) drive shaft 15, which operably couples to and drives a primary (rear) differential 16. The primary differential 16 drives a pair of aligned primary (rear) axles 17, both of which couple to a primary (rear) wheel assembly 18.

In the embodiment shown, the transfer case 13 also provides torque to a secondary (front) driveline assembly 21. The secondary driveline assembly 21 includes a secondary (front) drive shaft 22, which drives the secondary (front) differential 23. The secondary differential 23 provides drive torque through a pair of aligned secondary (front) axles 24, each of which couple to a secondary (front) wheel assembly 25. Locking hubs or axle disconnects (not shown) may be employed to couple or uncouple the secondary axles 24 from the secondary wheels 25.

In the embodiment shown, the primary driveline assembly 14 is the rear driveline and the secondary driveline assembly 21 is the front driveline, but those skilled in the art will realize that the disclosed embodiments are applicable to powertrains where the primary driveline is the front driveline. Both the primary driveline assembly 14 and the secondary driveline assembly 21 include suitable and appropriately disposed universal joints 26, which may be conventional or so-called "constant velocity" joints. The universal joints 26 may function in a conventional fashion to allow static and dynamic offsets and misalignments between the various shafts and components. Further, use of the term "couple" herein may refer to both a direct or an indirect connection between two components with or without one or more intervening connecting elements or structures. For example, in FIG. 1, the primary drive shaft 15 is coupled to the primary differential 16 despite the presence of at least one universal joint 26 therebetween.

Figure 2:
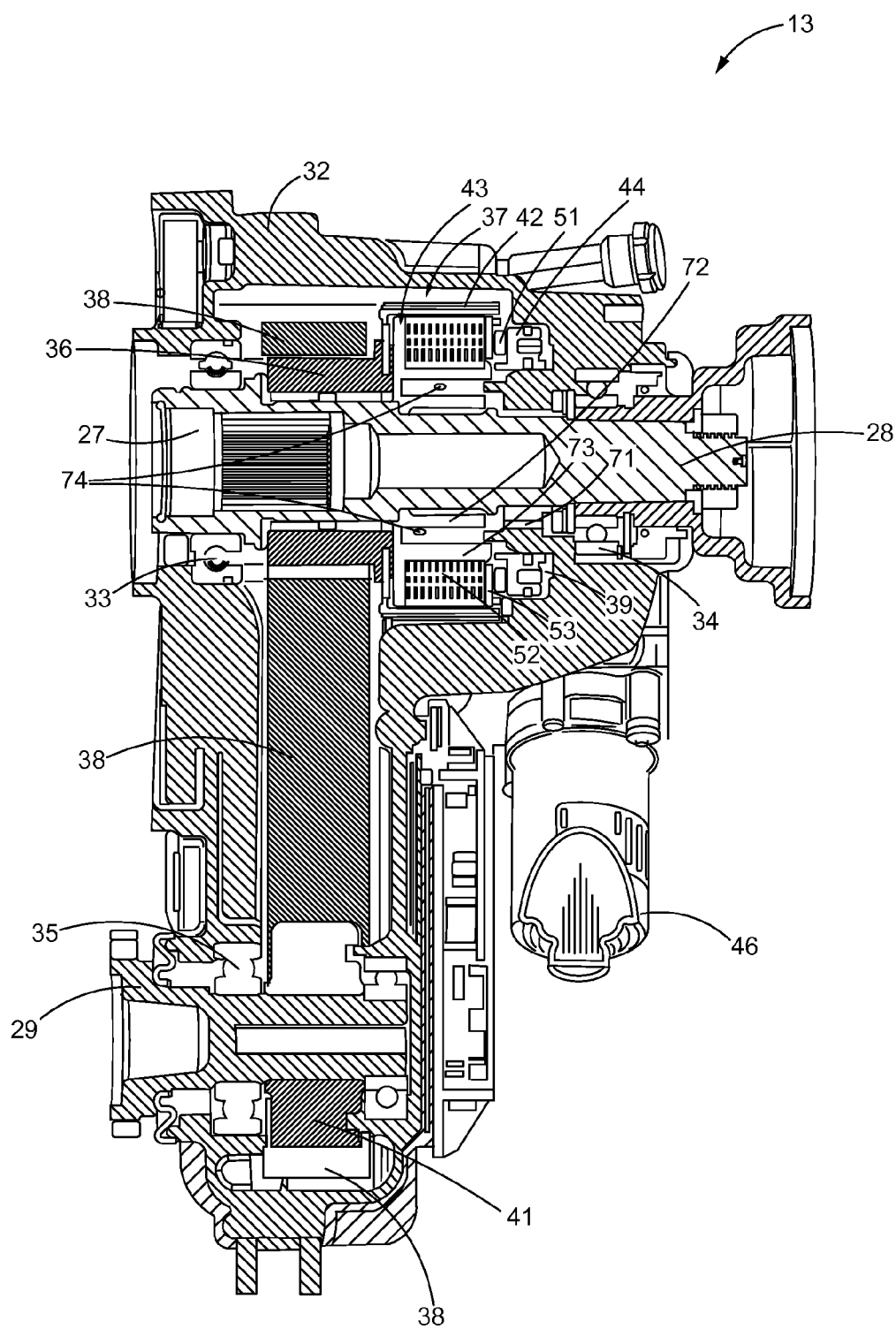
FIG. 2 is a sectional view of a motor vehicle transfer case made in accordance with this disclosure.

FIG. 2 is a cross-sectional view of the disclosed transfer case 13. An input shaft 27 delivers output drive power from the transmission 12 (FIG. 1) to the transfer case 13. The input shaft 27, the primary (rear) output shaft 28 and the secondary (front) output shaft 29 extend from an outer housing 32 of the transfer case 13. The primary and secondary output shafts 28, 29 (FIG. 2) couple to the primary and secondary drive shafts 15, 22 (FIG. 1) via the universal joints 26. The housing 32 may include various seals, recesses, shoulders, flanges, bores, etc. that receive and position the various components and parts of the transfer case 13. The input shaft 27 may couple to the primary output shaft 28 for AWD and two-wheel drive. The primary output shaft 28 may be rotatably mounted in the bearings 33, 34 at opposite ends thereof. The secondary output shaft 29 may also be rotatably mounted within the housing 32 on bearings 35.

The primary output shaft 28 rotatably passes through the input sprocket 36, which may be selectively driven by the primary output shaft 28 through the clutch 37. A chain 38 (or belt or idler or similar device) couples the input sprocket 36 to the output sprocket 41, which couples to the secondary output shaft 29 for rotation therewith. When the transfer case 13 is in the two-wheel drive mode, the clutch 37 is not activated, the primary output shaft 28 rotates freely within the input sprocket 36, and no output drive power is applied to the secondary output shaft 29 and output sprocket 41.

Referring to FIGS. 1 and 2, to initiate the AWD mode, the clutch 37 is activated to controllably and selectively provide rotational energy to the input sprocket 36 from the primary output shaft 28 so that the input sprocket 36 will provide rotational energy as needed or selected to the secondary wheels 25 via the chain 38, output sprocket 41, secondary output shaft 29, secondary drive shaft 22, differential 23 and secondary axles 24. In the AWD mode, the shafts 15, 22 (FIG. 1) may be allowed to rotate at different speeds for smooth vehicle handling. When the clutch 37 is fully in the AWD mode or fully engaged with the primary output shaft 28, the clutch 37 and the input sprocket 36 will rotate at the same speed or nearly the same speed with only some slippage. Under these conditions, the primary and secondary drive shafts 15, 22 may rotate at or close to the same speed.

The clutch 37 may be in the form of a multiple plate friction clutch pack 52 that includes a first plurality of friction clutch plates or disks interleaved with a second plurality of friction clutch plates or disks. In the embodiment shown, the first plurality disks may be smaller in diameter than the second plurality of disks. The disks may include suitable clutch paper or friction material in accordance with conventional practice. Each of the smaller disks may couple to the primary output shaft 28 by a clutch hub 43. The clutch hub 43 may couple to the primary output shaft 28 using a splined connection and, similarly, splined connections may couple the smaller disks to the clutch hub 43. Each of the larger disks of the clutch pack 52 may couple to an interior of a cylindrical portion of a clutch drum 42 for receiving output torque. The clutch drum 42 may couple to the input sprocket 36 as shown in FIG. 2 and receive torque from the clutch pack 52 to drive the input sprocket 36.

Actuation of the clutch 37 occurs by supplying pressurized hydraulic fluid to the annular cavity 39, which is disposed opposite a clutch piston 44 from the clutch pack 52. A pressure plate 53 and thrust bearing 51 may be disposed between the clutch piston 44 and the clutch pack 52 as shown in FIG. 2. When the cavity 39 is pressurized, the clutch piston 44 moves towards the thrust bearing 51, pressure plate 53 and clutch pack 52 thereby compressing the clutch pack 52 against the clutch hub 43. The compressed clutch pack 52 then transmits torque and rotary motion from the smaller disks that are connected to the clutch hub 43 to the larger disks that are connected to the clutch drum 42, which in turn couples to the input sprocket 36.

Figure 6:
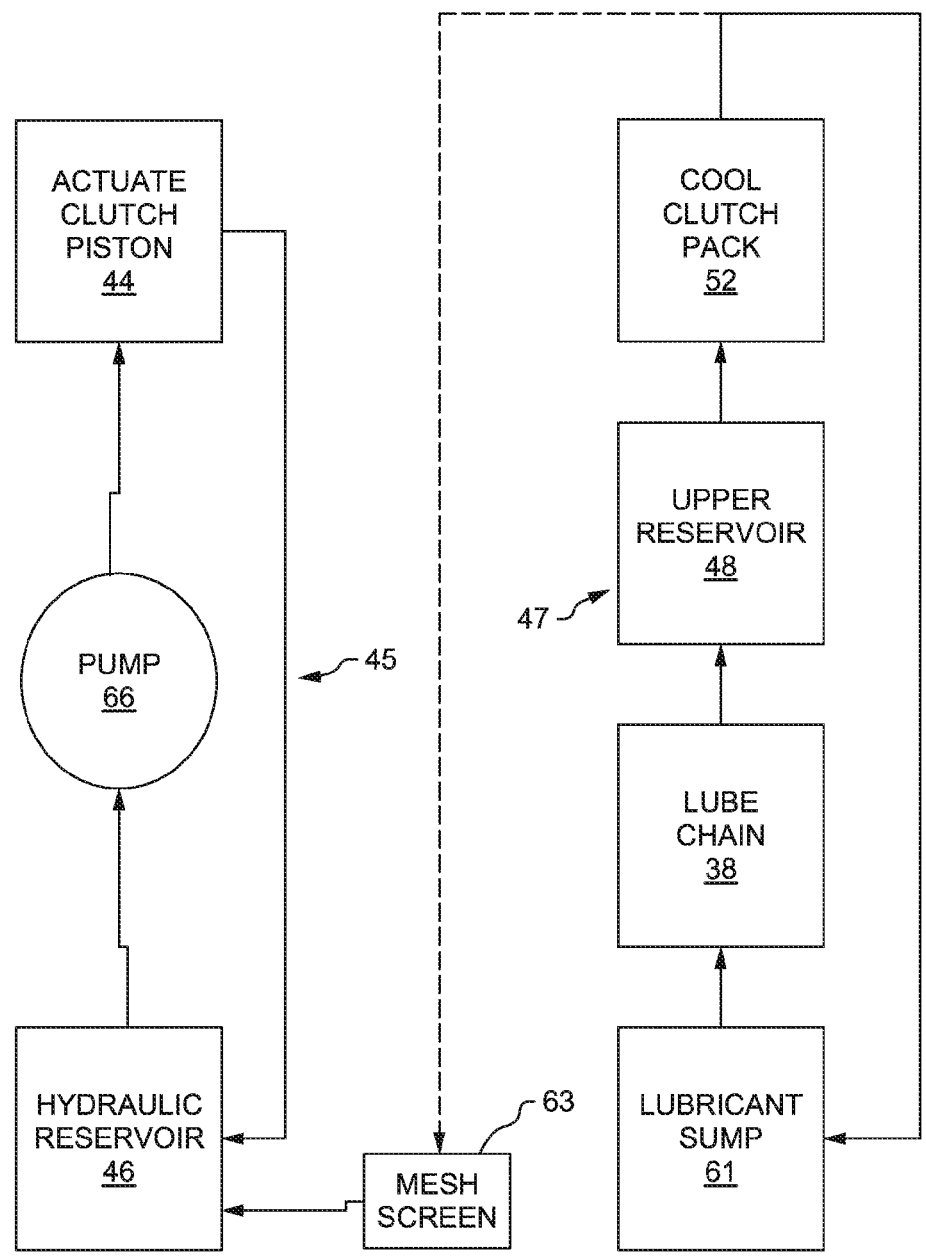
FIG. 6 is a schematic representation of the hydraulic fluid circuit and lubricant fluid circuit of the disclosed hydraulic clutch assembly and transfer case.

FIG. 6 shows two fluid circuits including a hydraulic fluid circuit 45 and a lubricant fluid circuit 47. The hydraulic fluid circuit 45 includes a hydraulic fluid reservoir 46 and the lubricant fluid circuit 47 includes a lubricant sump 61 and an upper reservoir 48. Both fluid circuits 45 and 47 may be disposed within the housing 32 of the transfer case 13 and both may contain hydraulic based fluid. The hydraulic fluid circuit 45 provides pressurized fluid to the cavity 39 (FIG. 2) for purposes of driving the clutch piston 44 and actuating the clutch 37. During normal use, the hydraulic fluid circuit 45 may lose fluid through leakage, weeping through seals, etc. To avoid dismantling the transfer case 13 to reach and refill the hydraulic fluid reservoir 46, the hydraulic fluid circuit 45 may be replenished with fluid from the lubricant fluid circuit 47 in the following manner.

Figure 3:
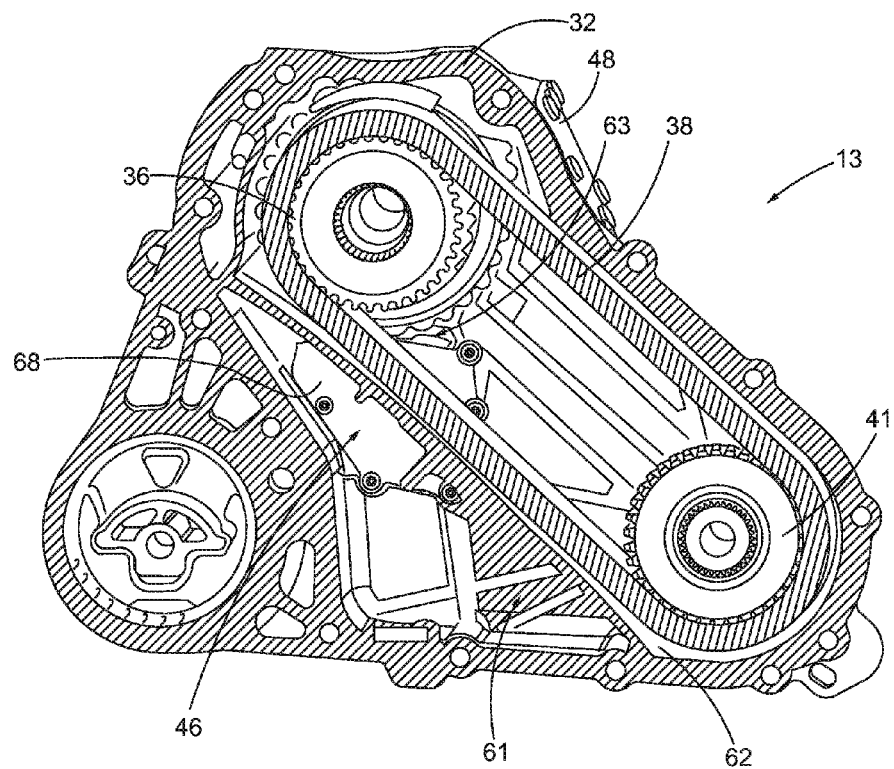
FIG. 3 is a side plan view of the transfer case shown in FIG. 2.

Fluid from the lubricant sump 61 (FIG. 3) is metered through the opening 62 to lubricate the chain 38. Further, some fluid from the lubricant sump 61 is transferred from the rotating chain 38 (e.g., by splashing) to the upper reservoir 48 (FIG. 3). Fluid from the upper reservoir 48 flows through and cools the clutch pack 52 before some of the fluid returns to the lubricant sump 61 as shown in FIG. 6. Specifically, the upper reservoir 48 is in communication with the lubricant passage 71 (FIG. 2), which delivers fluid between the inner and outer rings 72, 73 of the clutch hub 43. The outer ring 73 may include one or more openings 74 for communicating fluid to the clutch pack 52. However, some of the fluid applied to the chain 38 from the lubricant sump 61 and some of the fluid that passes through the clutch pack 52 via the upper reservoir 48 is inevitably lost as the chain 38 and clutch 37 rotate, which results in some fluid dripping from or being sprayed from the rotating chain 38 and clutch 37. Specifically, fluid may exit the clutch hub 43 and drip or be sprayed from vicinity of the chain 38 and the input sprocket 36. This disclosure exploits this condition by capturing at least some of the fluid released from the chain 38 and/or clutch pack 52 and using the captured fluid to replenish the hydraulic fluid circuit 45. By capturing some of the fluid that is sprayed or dripped from the chain 38 and/or the clutch pack 52 and using that captured fluid replenish the hydraulic fluid circuit 45, the hydraulic fluid reservoir 46 of the hydraulic fluid circuit 45 may never need to be refilled.

Figure 4:
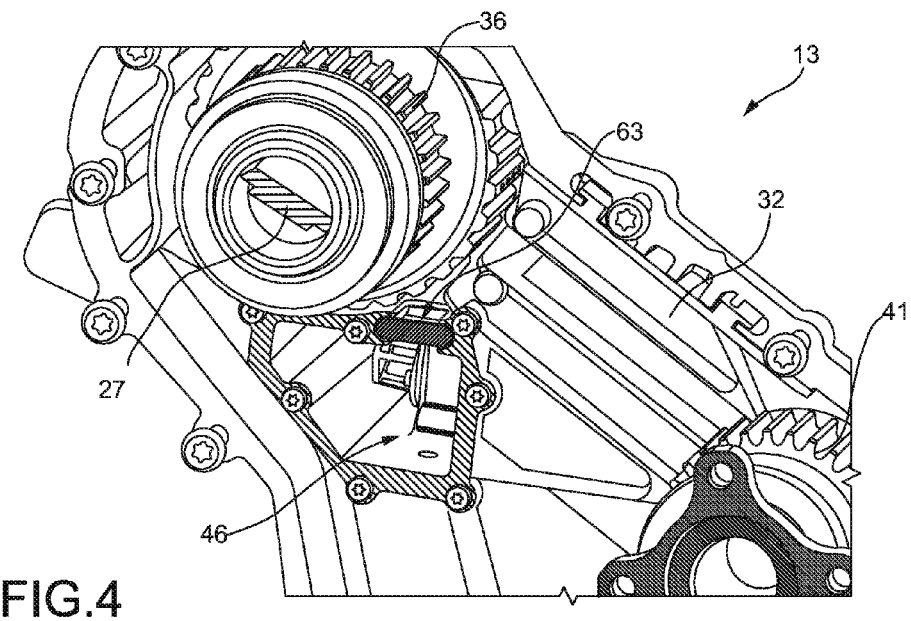
FIG. 4 is a partial side plan view of the transfer case shown in FIGS. 2 and 3, with the chain and the cover for the hydraulic fluid reservoir removed.

As shown in FIG. 3, the chain 38 couples the input sprocket 36 to the output sprocket 41. Lubricant fluid from the lubricant fluid circuit 47 (FIG. 6) may be metered to the rotating chain 38. In one example, the housing 32 of the transfer case 13 may include a lower cavity that serves as the lubricant sump 61. The lubricant sump 61 accumulates lubricant fluid, which is metered to the chain 38 through the opening 62. Lubricant fluid is then carried up the chain, and around the input sprocket 36. Inevitably, some lubricant fluid will be released by the chain 38 and/or the clutch pack 52 in the form of drips or a spray. To capture at least part of this released fluid, a screen 63 may be placed below or in the vicinity of the chain 38 as shown in FIGS. 3-4. At least some of the lubricant fluid drops and/or lubricant fluid spray is deposited on or captured by the screen 63. Further, the screen 63 is disposed above the reservoir 46. Because the lubricant fluid released from the chain 38 and/or clutch pack 52 may contain metal particles, the screen 63 serves to remove any such metal particles from the fluid that passes through the screen 63. The mesh of the screen 63 may range from 10 microns to 100 microns. The screen 63 prevents large amounts of dirty lubricant fluid from entering the hydraulic fluid circuit 45. Only small amounts of clean lubricant fluid are needed to replenish the hydraulic fluid circuit 45 and the replenishing will automatically take place during normal use of the transfer case 13.

Figure 5:
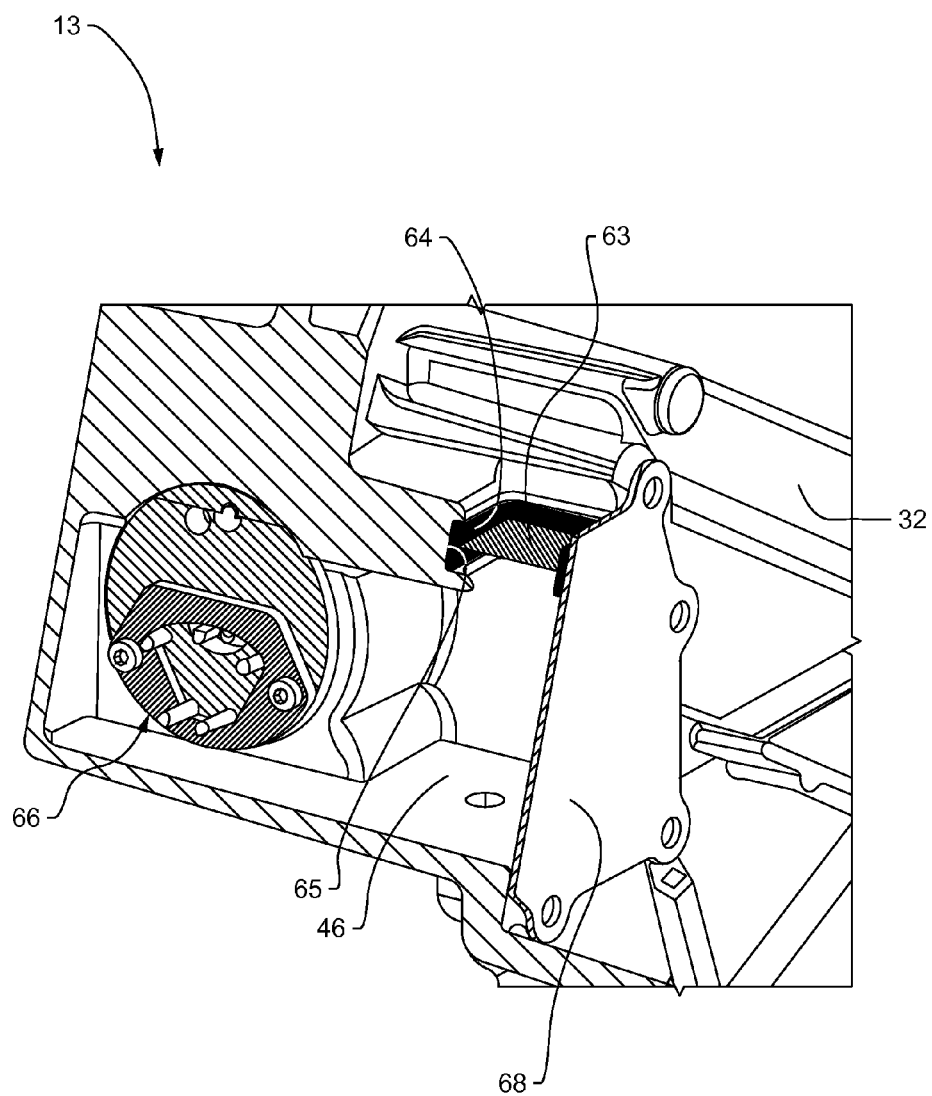
FIG. 5 is a partial end view of the transfer case shown in FIGS. 2-4, particularly illustrating the placement of the screen above the hydraulic fluid reservoir.

As shown in FIG. 5, the screen 63 may be surrounded by a frame 64 and the frame 64 may be received in a slot 65 disposed in the housing 32 of the transfer case 13. FIG. 5 also illustrates the cover 68 for the hydraulic fluid reservoir 46 and the pump 66 that pulls fluid from the reservoir 46 before delivering the fluid to the cavity 39 (FIG. 2) for purposes of driving the piston 44 towards the clutch pack 52.

INDUSTRIAL APPLICABILITY

A transfer case 13 and clutch 37 include a hydraulic fluid circuit 45 and a lubricant fluid circuit 47. The lubricant fluid circuit 47 delivers lubricant to the chain 38 that links the input sprocket 36 to the output sprocket 41. The hydraulic fluid circuit 45 delivers pressurized fluid to a cavity 39 disposed opposite the piston 44 from the clutch pack 52 of the clutch 37. Typically, these two fluid circuits are isolated from one another as lubricant fluid is stored in a lubricant sump 61, is continuously recycled and can be changed during regular maintenance procedures. In contrast, the hydraulic fluid circuit 45 is typically a closed circuit as contaminates and debris could be detrimental to the pump 66. However, the hydraulic fluid circuit 45 will inevitably lose fluid due to leakage, etc. Further, replenishing the hydraulic fluid circuit 45 would be difficult and therefore costly due to the compact design of the transfer case 13. To solve this problem, lubricant fluid that is released from the chain 38 and/or clutch pack 52 is captured, screened and supplied to the hydraulic fluid reservoir 46. Specifically, the hydraulic fluid reservoir 46 is disposed near the chain 38. A screen is strategically replaced on top of the hydraulic fluid reservoir 46, and in a position where dripping or spraying of lubricant fluid occurs. Lubricant fluid then drips or is sprayed onto the screen 63, which filters out any metal particles, before passing the lubricant fluid into the hydraulic fluid reservoir 46. Thus, the hydraulic fluid reservoir 46 is replenished with screened or clean fluid and therefore the hydraulic fluid reservoir 46 does not need to be replenished, which would involve a costly and timely maintenance procedure.

While only certain embodiments of been set forth, alternative embodiments and various modifications will be apparent from the above description to those skilled in the art. These and other alternatives are considered equivalents and within the spirit and scope of the present disclosure.

What is claimed:

1. A hydraulic clutch assembly for a motor vehicle driveline, the clutch assembly comprising:
   a primary output shaft selectively coupled to an input sprocket by a clutch pack, a secondary output shaft coupled to an output sprocket, the input sprocket coupled to the output sprocket by a chain;
   the clutch pack including a first plurality disks and a second plurality of disks interleaved with the first plurality of disks, the first plurality of the disks coupled to the primary output shaft and the second plurality of the disks coupled to the input sprocket, the clutch further including a piston disposed between a cavity and the clutch pack;
   a hydraulic fluid circuit in fluid communication with the cavity for delivering pressurized fluid to the cavity for biasing the piston towards the clutch pack thereby compressing the clutch pack;
   a lubricant fluid circuit in fluid communication with the chain and the clutch pack;
   a screen in fluid communication with the hydraulic fluid circuit, the screen positioned to capture lubricant fluid released from the chain and/or clutch pack for replenishing the hydraulic fluid circuit with lubricant fluid released from the chain and/or clutch pack after said lubricant fluid passes through the screen, the lubricant fluid released from the chain and/or clutch pack being sprayed and/or dripped directly onto the screen from the chain and/or clutch pack.

2. The clutch assembly of claim 1 wherein the hydraulic fluid circuit and the lubricant fluid circuit each contain hydraulic based fluid.

3. The clutch assembly of claim 1 wherein the hydraulic fluid circuit includes a pump disposed upstream of the cavity.

4. The clutch assembly of claim 1 wherein the lubricant fluid released from the chain and/or clutch pack is sprayed onto the screen as the chain rotates around the input and output sprockets.

5. The clutch assembly of claim 1 wherein the hydraulic fluid circuit includes a hydraulic fluid reservoir, the screen being disposed above the hydraulic fluid reservoir and below at least part of the chain.

6. The clutch assembly of claim 1 wherein the screen is surrounded by a frame, the frame releaseably connected above the hydraulic fluid reservoir.

7. A transfer case for a motor vehicle driveline, the transfer case comprising:
   a housing rotatably supporting a primary output shaft and a secondary output shaft, the primary output shaft selectively coupled to an input sprocket by a clutch, the secondary output shaft coupled to an output sprocket, the input and output sprockets coupled together by a chain;
   the clutch including a clutch pack including a first plurality disks and a second plurality of disks interleaved with the first plurality of disks, the first plurality of the disks coupled to the primary output shaft and the second plurality of the disks coupled to the input sprocket, the clutch further including a piston disposed between a cavity and the clutch pack;
   a hydraulic fluid circuit including a reservoir in fluid communication with a pump that is in fluid communication with the cavity for delivering pressurized fluid to the cavity thereby biasing the piston towards the clutch pack thereby compressing the clutch pack;
   a lubricant fluid circuit including a sump in fluid communication with the chain and the clutch pack;
   a screen connected to the housing and disposed above and in fluid communication with the reservoir, the screen positioned below at least part of the chain to capture lubricant fluid released from the chain and/or clutch pack for replenishing the hydraulic fluid circuit with lubricant fluid released from the chain and/or clutch pack after said lubricant fluid passes through the screen, the lubricant fluid released from the chain and/or clutch pack being sprayed and/or dripped directly onto the screen from the chain and/or clutch pack.

8. The transfer case of claim 7 wherein the reservoir and sump each contain hydraulic based fluid.

9. The transfer case of claim 7 wherein the lubricant fluid released from the chain and/or clutch pack is sprayed onto the screen as the chain rotates around the input and output sprockets.

10. The transfer case of claim 7 wherein the screen is surrounded by a frame, the frame releaseably connected to the reservoir and the housing.

11. A method for replenishing a hydraulic fluid circuit of a transfer case with fluid from a lubricant circuit of the transfer case, the method comprising:
    providing a housing that rotatably supports a primary output shaft and a secondary output shaft;
    coupling the primary output shaft to an input sprocket via a clutch pack;
    coupling the secondary output shaft to an output sprocket;
    coupling the input sprocket to the output sprocket with a chain;
    providing a hydraulic fluid circuit including a reservoir in fluid communication with a pump that is in fluid communication with a cavity that is in fluid communication with a piston;
    providing a lubricant fluid circuit including a sump in fluid communication with the chain and the clutch pack;
    delivering pressurized hydraulic fluid to the cavity thereby biasing the piston towards the clutch pack;
    compressing the clutch pack to transfer torque from the primary output shaft to the input sprocket and from the input sprocket to the output sprocket through the chain;
    providing a screen disposed below at least part of the chain and above the reservoir;
    lubricating the chain and the clutch pack with a lubricant fluid from the lubricant fluid circuit;
    allowing at least some of the lubricant fluid to spray and/or drip off of the chain and/or clutch pack directly onto the screen so that the screen captures at least some of the lubricant fluid released from the chain and/or clutch pack;
    filtering the captured lubricant fluid with the screen; and
    passing the filtered lubricant fluid to the reservoir.

12. The method of claim 11 wherein the lubricant fluid released from the chain and/or clutch pack is sprayed onto the screen as the chain rotates around the input and output sprockets.

* * * * *